United States Patent [19]
Fahl

[11] Patent Number: 5,005,876
[45] Date of Patent: Apr. 9, 1991

[54] QUICK CONNECT-DISCONNECT COUPLINGS

[75] Inventor: Richard L. Fahl, Fairfield, Ohio

[73] Assignee: Dover Corporation, New York, N.Y.

[21] Appl. No.: 452,762

[22] Filed: Dec. 19, 1989

[51] Int. Cl.⁵ ............................................. F16L 37/20
[52] U.S. Cl. ...................................... 285/311; 285/312
[58] Field of Search .................. 285/311, 312, 88, 33; 292/DIG. 49

[56] References Cited

U.S. PATENT DOCUMENTS

| | | | |
|---|---|---|---|
| 757,752 | 4/1904 | Killen | 285/311 |
| 863,903 | 8/1907 | Chapple | 285/312 |
| 1,361,856 | 12/1920 | Heninger | 285/311 |
| 1,943,496 | 1/1934 | Thompson | 285/311 |
| 3,278,205 | 10/1966 | Barlow | 285/311 |
| 3,409,316 | 11/1968 | Jewell | 285/311 |
| 3,494,641 | 2/1970 | Caregnato | 285/311 |
| 4,213,643 | 7/1980 | Blind et al. | 292/DIG. 49 |
| 4,575,130 | 3/1986 | Pemberton et al. | 285/312 |
| 4,583,442 | 4/1986 | Minor | 292/DIG. 49 |

Primary Examiner—Eric K. Nicholson
Attorney, Agent, or Firm—Kinney & Schenk

[57] ABSTRACT

A quick connect-disconnect coupling comprises a coupler joined to a standardized adapter to provide for fluid flow between first and second conduits. Locking mechanism comprises a four bar linkage which minimizes the manual effort required to connect and disconnect the coupler from the adapter. An over the center relation of the four bar linkage locks the coupler in coupled relation to the adapter to minimize inadvertent decoupling.

12 Claims, 4 Drawing Sheets

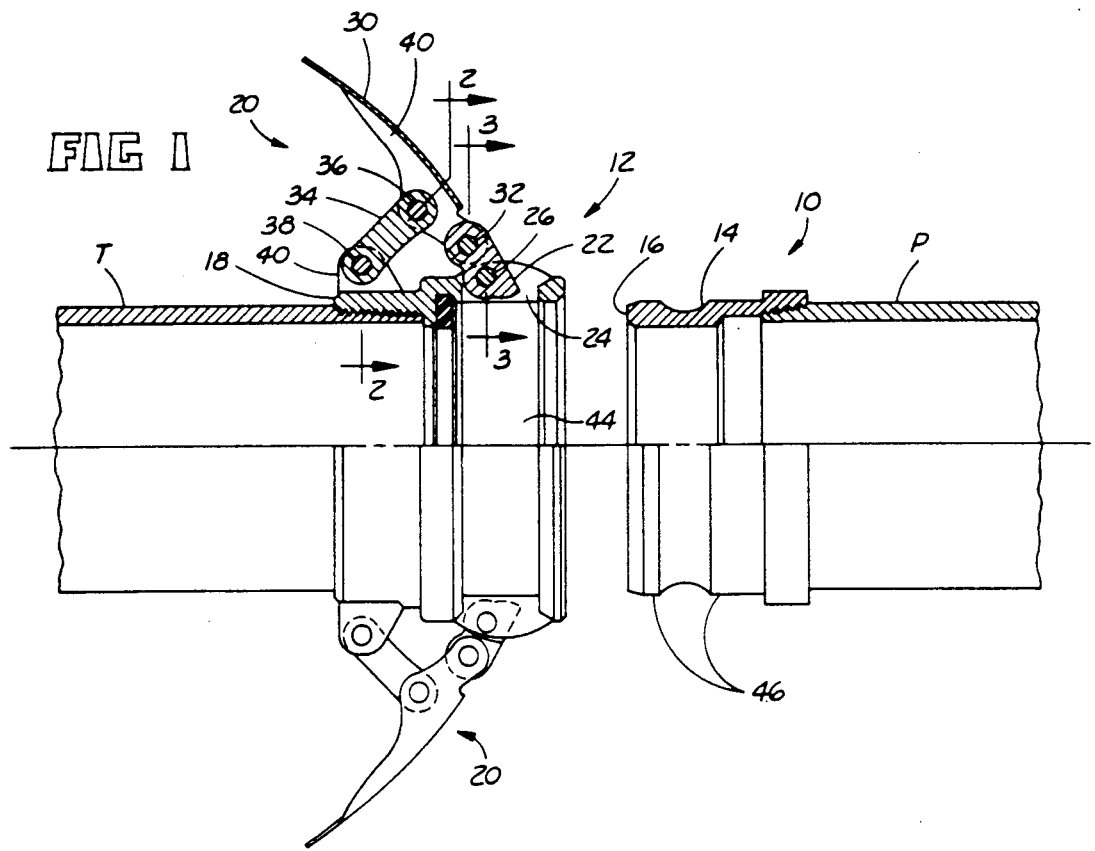
FIG 1
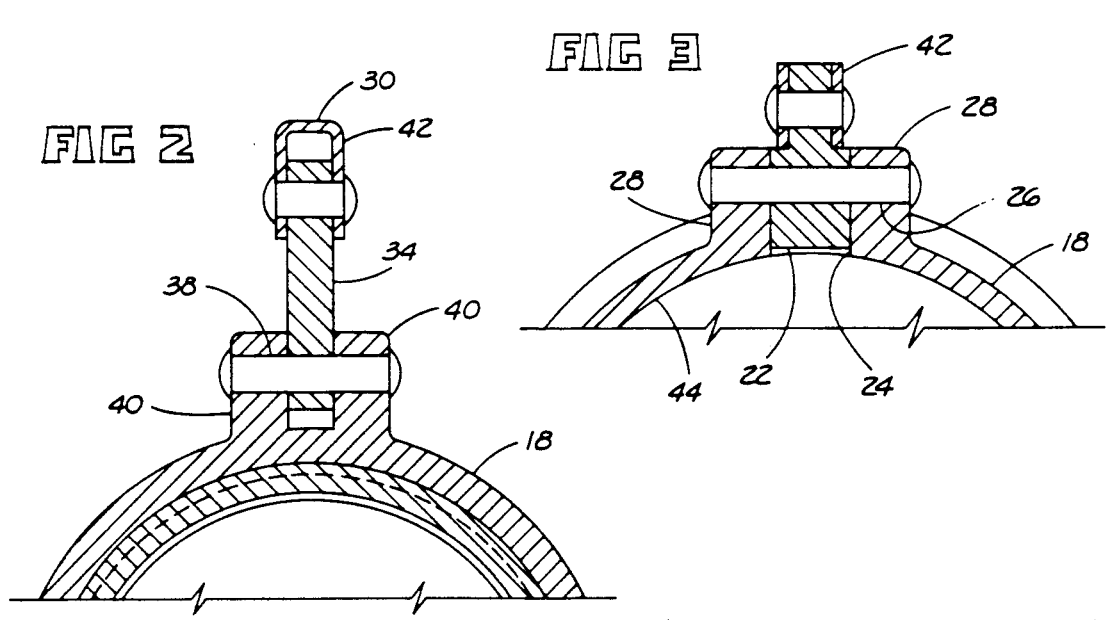
FIG 2
FIG 3

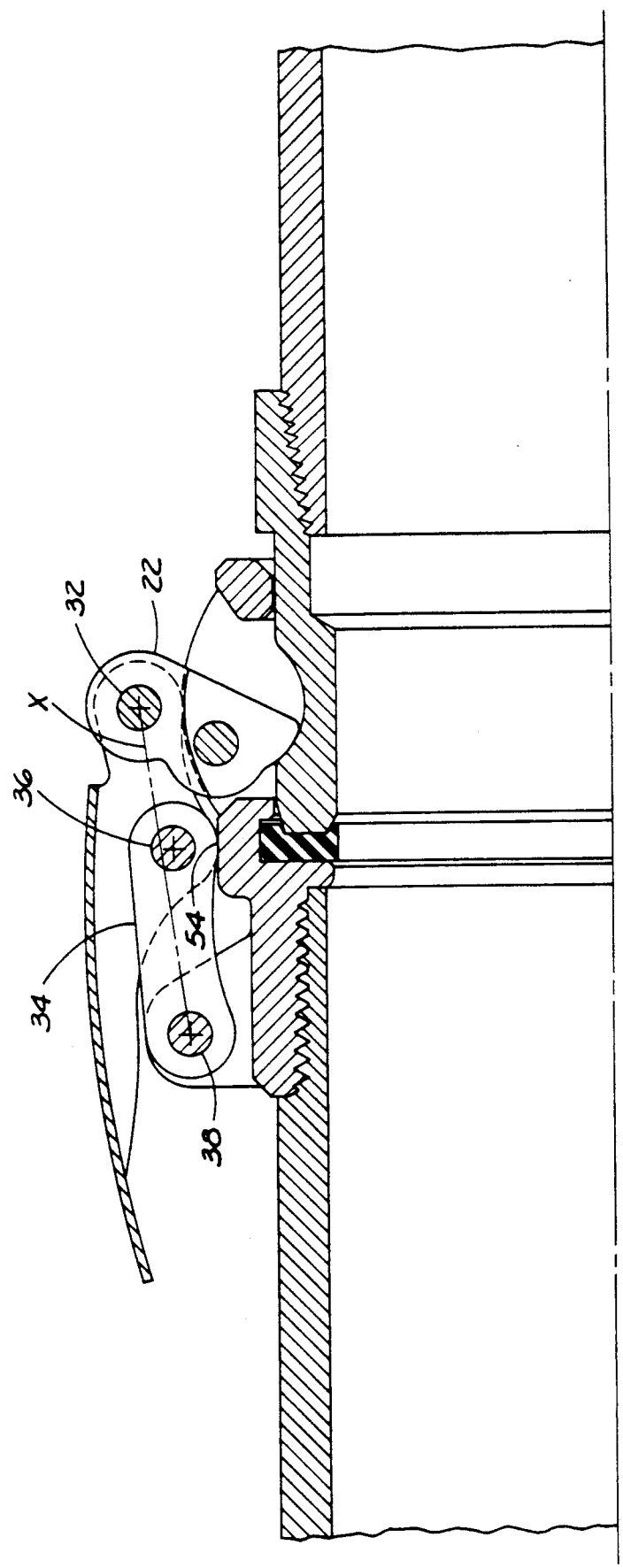

QUICK CONNECT-DISCONNECT COUPLINGS

The present invention relates to improvements in couplings and more particularly to quick connect-disconnect couplings for fluid conduits, such as conduits employed transferring liquids from one storage tank to another in the petroleum industry.

Quick connect-disconnect couplings of the type herein referenced are in wide spread use for conduits having diameters ranging from roughly one to eight inches (theoretically there are no size limitations). Basically these quick connect-disconnect couplings comprise a coupler and an adapter. The adapter is usually mounted on a relatively fixed conduit, such as the inlet to an underground storage tank. The coupler is usually mounted on what amounts to a hose, as would be used in filling the underground tank. The adapter has an arcuate groove adjacent its outer end over which the coupler is telescoped. A pair of cam levers, on the coupler, are then swung into engagement with the groove to force the end of the adapter into sealing engagement with a gasket mounted in the coupler.

Disconnecting the coupler from the adapter simply requires rotation of the cam levers in opposite directions.

The simple swinging of cam levers in one direction or the other to connect or disconnect the coupling has led to the widespread acceptance of this type of coupling. The configuration of the adapter has been standardized for a wide range of conduit sizes and remains on the pipes of tanks, or other conduits, so that a hose may be readily connected therewith. Couplers, on the other hand may vary in design details, but nonetheless are designed to cooperate with a standardized adapter.

Despite the effectiveness of these quick connect-disconnect couplings, there are shortcomings which make their use somewhat difficult, at times.

Particularly in the larger sizes of these quick connect-disconect couplings, relatively large forces are required to rotate the cam levers a sufficient distance to assure that an effective seal has been obtained between the coupler and the adapter. It is not an uncommon practice for these levers to be pounded with a wrench, or similar article, to bring them into a position in which the desired seal is obtained. Similarly, the same wrench may be employed to pry the cam levers in swinging them to positions in which the coupling may be disconnected.

The need, or perceived need, to employ such mechanical persuasion in swinging the cam levers between their lock and release positions, stems from the high frictional forces which are inherent in the cam action by which a sealing force is obtained in conventional quick connect-disconnect couplings. More specifically, these cam members move, relative to the groove surface of the adapter, in a direction opposite to the direction of movement of the adapter relative to the coupler. In effect, a wedging action is relied upon in order to displace the end of the adapter into sealing engagement with the coupler. This involves high frictional loadings with a relatively lengthy sliding movement between the cam members and the adapter.

The relatively long path of sliding movement of these cam members leads to wear, which, in the usual case, further increases friction and greater difficulty in swinging the cam levers.

A further problem of high friction is that it becomes difficult for a worker to be certain that the cam levers have been swung sufficiently to effect a seal. This is to say that, at times, a worker might assume that a seal has been obtained because the levers resist further swinging movement, when, in fact, it is friction that resists movement of the cam lever and a seal has not been obtained. In other words, there is nothing that gives the worker an assurance that the desired seal between the coupler and the adapter has been obtained.

Accordingly, the primary object of the present invention is to provide an improved quick connect-disconnect coupling which be engaged and disengaged with relatively small forces to increase ease of use.

Another object of the present invention is to provide an improved quick connect-disconnect coupling which gives assurance that a seal has been obtained between its coupler and adapter.

Another object of the present invention is to provide an improved coupler which is adapted for use with a standard adapter and which provides the stated ease of use and assurance of obtaining a seal.

These ends may be attained, pursuant to the present invention, by a quick connect-disconnect coupling comprising an adapter adapted to be mounted on a first fluid conduit and having a sealing surface at its outer end and an undercut outer surface spaced from and adjacent thereto. This coupling further includes a coupler adapted to be attached to a second fluid conduit and comprising a body member having a bore for telescopingly receiving the outer end portion of the adapter, and at least one locking mechanism for joining the coupler and the adapter. Where a plurality of locking mechcanisms are employed, they would be equi-angularly spaced relative to the coupler.

The locking mechanism comprises a four bar linkage including a manually operable lever, a link pivotally connected to the lever and to the body member, and a cam member pivotally connected to the lever and to the body member.

The cam member has a finger extending inwardly from its pivotal connection with the body member. This finger is engageable with the undercut surface of the adapter when it is telescoped within the bore of the body member.

The lever has an open position in which the cam member finger is disposed outside the outline of the bore in the body member. The lever also has a closed position in which the finger engages the undercut surface of the adapter and maintains a sealed relation between the adapter and the coupler. This sealed relation is preferably obtained by compression of a gasket, mounted on the body member.

The cam member finger has an axial movement vector extending in the same direction as axial movement of the adapter when the lever is pivoted towards its closed position. Preferably the surface of the finger, which engages the undercut surface of the adapter, is convexly curved. These features minimize friction when the locking mechanism is actuated by the manually operated lever.

The four bar linkage is preferably proportioned so that the mechanical advantage of lever movement relative to finger movement increases as the lever approaches its closed position. This, along with the minimization of friction forces otherwise provided minimizes the force required to swing the lever to its closed position.

Preferably, the four bar linkage has an over the center relation in the closed position of the of the lock mechanism lever to lock the lever therefor in a closed position.

The ends of the present invention may also be attained by a coupler which has locking mechanisms adapted to cooperate with and join the coupler with an adapter having a standardized configuration. The locking mechanism can be defined in move specific language to define the features of the invention.

The above and other objects and features of the invention will be apparent from a reading of the following description of a preferred embodiment and the novelty thereof pointed out in the appended claims.

In the drawings:

FIG. 1 is an elevation, partially in longitudinal section, of a quick connect-disconnect coupling embodying the present invention and illustrated in a disconnected position;

FIG. 2 is a section taken on line 2—2 in FIG. 1;

FIG. 3 is a section taken on line 3—3 in FIG. 2;

FIG. 6 is a view similar to FIGS. 4 and 5, illustrating the cam means in a locked position.

Figure 4:
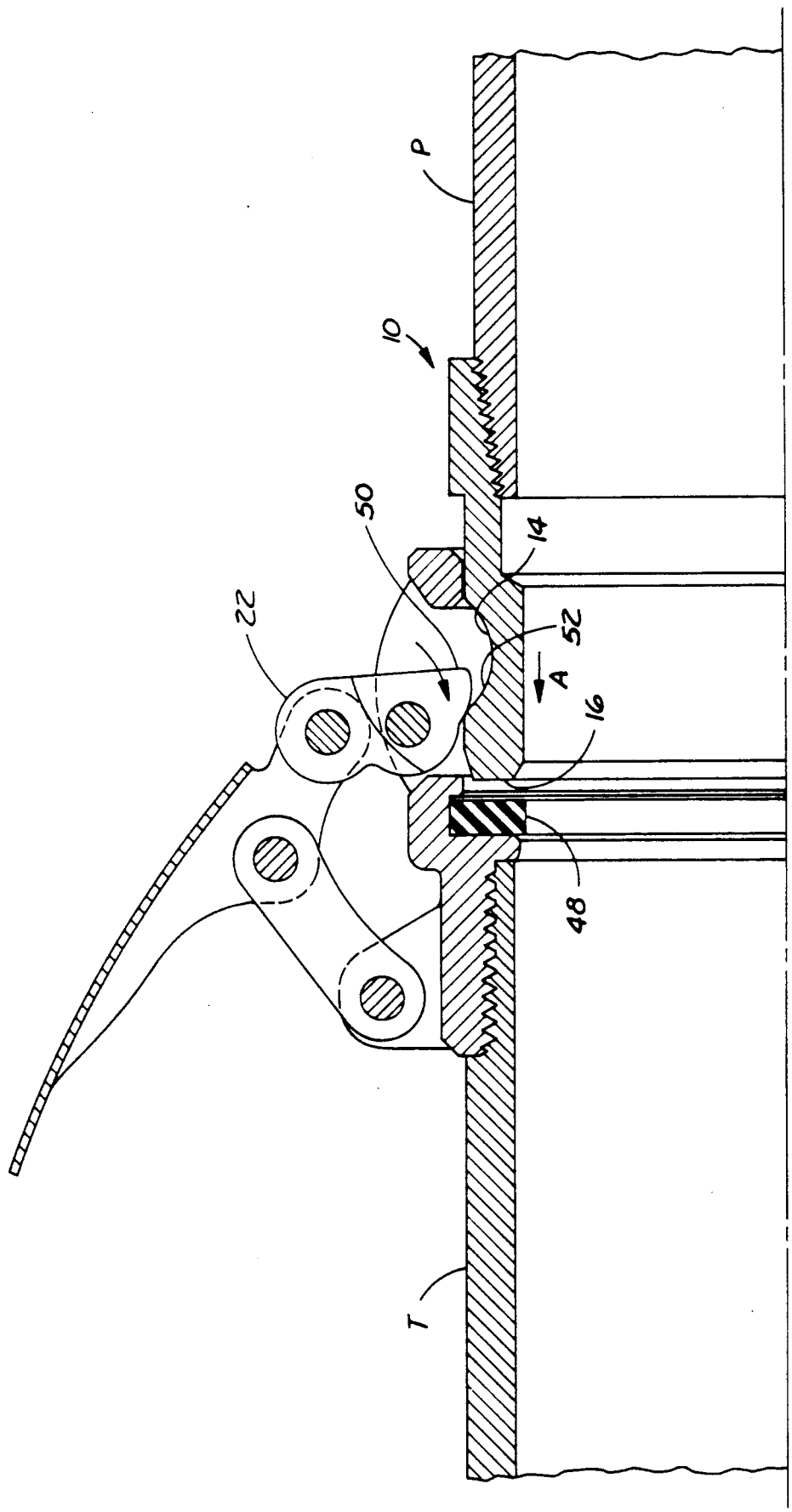
FIG. 4 is a longitudinal section of cam locking means, seen in FIG. 1, illustrating its action in effecting a connection between a coupler and adapter of the quick connect-disconnect coupling.

The quick connect-disconnect coupling of the present invention comprises an adapter 10 and a coupler 12, which are shown in FIG. 1 in a separated position, aligned to be connected.

The adapter 10 is of a standardized configuration, as established for the type of quick connect-disconnect couplings to which the present invention relates. In accordance with usual industry practices, the adapter 10 would be permanently mounted on a pipe P, by the illustrated thread connection. The pipe P is representative of an inlet/outlet conduit for a fuel storage tank, or other conduit system to which a hose connection is to be made.

More specifically, the adapter 10 has an arcuate groove 14 formed in its outer surface, adjacent and spaced from its outer end which is defined by an annular sealing surface 16.

The coupler 12 comprises an annular body member 18 mounted on a hose or other conduit which is to be connected to the storage tank with which the pipe P communicates. Various means can be made to effect a connection between the coupler 12 and the hose (not shown). For illustrative purposes, a threaded connection is shown between the body member 18 and a tubular member T to which the hose is connected.

The coupler has two locking mechanisms 20 which may be identical in construction and spaced, 180 degrees apart, on opposite sides of the body member 18.

Each locking mechanism comprises a cam member 22 disposed in an opening 24 extending through the body member 18, adjacent its outer end. The inner end of the cam member 22 is pivotally mounted on a pin 26 which extends between ears 28 which further define the opening 24. The upper end of the cam member 22 is pivotally connected to a lever 30 by a pin 32.

The lever 30 is then connected, outwardly of the cam member 22, to the body member 18 by a link 34. The link 34 is pivotally connected to the lever 30 by a pin 36 an pivotally mounted, by a pin 38, between ears 40 which project outwardly from the body member 18.

It will be seen that the lever 30 has a generally U-shaped cross section providing legs 42 on which the pins 32 and 36 are mounted. Axially movement of the pins 26, 32, 36 and 38 may be restrained by appropriate means, such as cotter pins, or, as illustrated, by integrally formed heads at their opposite ends.

It will also be seen the inner end of the cam member 22, disposed within the slot 24, has a width greater than its outer end, which is disposed between the lever legs 42. The increased width of the inner end of the cam member 22 provides for an improved distribution of stresses, as will later appear.

It will be recognized that the described connections between the body member 18, link 34, lever 30 and cam member 22 form a four bar linkage.

The outer end of the body member has a bore 44 which is somewhat larger than the outer diameter 46 of the adapter 10 so that the coupler may be readily telescoped thereover and maintained, generally, in alignment therewith. It will also be noted, from FIG. 1, that the cam members 22 are disposed, in the slots 24, wholely outside of the bore 44, when the levers 30 are in their outer, open positions. All of this permits the coupler to be freely telescoped over the outer end of the adapter 10 to the position illustrated in FIG. 4.

FIG. 4 also illustrates that, after being manually telescoped with respect to the adapter 10, the cam members 22 may assist in drawing the adapter 10, and, particularly its sealing surface 16 towards and into engagement with a gasket 48, mounted on the coupler 12.

The inner ends of the cam members form arms, or fingers, 50 which, when the levers 30 are swung inwardly, enter the adapter groove 14 and engage the forward, undercut portion thereof, indicated at 52. The fingers 50 thus draw the adapter 10 in the direction of arrow A towards sealing engagement with the coupler 12. It is to be observed that the fingers 50 are moving (rotating), generally in the same direction as the relative movement of the adapter 10. That is, the vectors of axial movement of the fingers is in the same direction as the axial movement of the adapter to the coupler. It is also to be noted that the surfaces of the finger are convexly curved so that there is, essentially, point contact between the fingers and the undercut surface 52. Relative movement between the fingers 50 and the undercut surface 52 is more in the nature of rolling movement in the displacement of the adapter to a sealing position and relative sliding movement therebetween is greatly minimized. Thus there are only minimal frictional forces to be overcome in connecting the present coupling.

Figure 5:
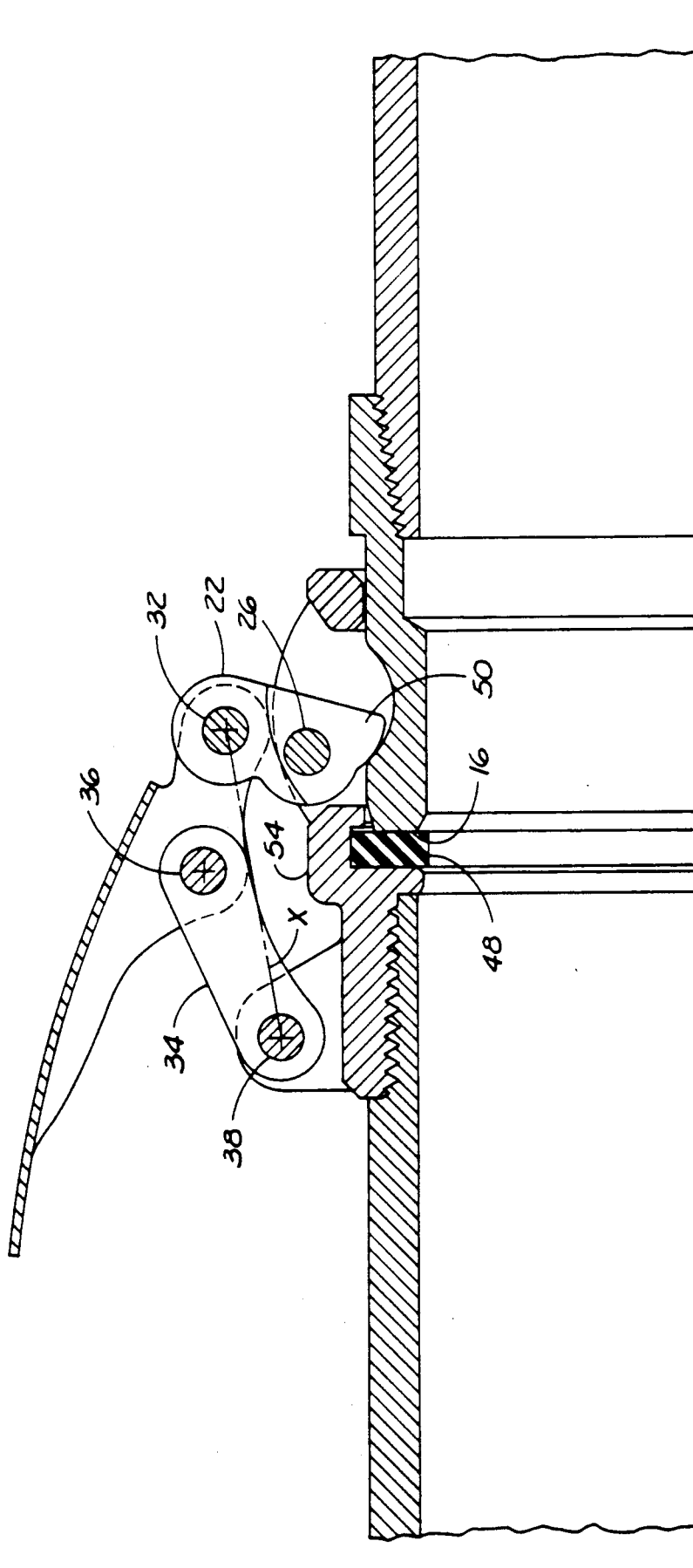
FIG. 5 is a view similar to FIG. 4 illustrating the cam locking means just prior being in a locked position.

Continued inward movement of the levers 30 brings the fingers 50 to the position shown in FIG. 5, in which the sealing surface engages the gasket. It will be noted that the described four bar linkage provides an increasing mechanical advantage as the levers are swung inwardly from their outer, open positions. During this period of initial movement, the mechanical advantage is relatively small and, at the same time, resistance to axial movement is also small until the position of FIG. 5 is reached. Thereafter, further axial movement must overcome the resistance of the gasket 48 as it is compressed to obtain an effective seal. The four bar linkage, in the position of FIG. 5 has reached a point where there is a substantial mechanical advantage between the movement of the lever 30 and the movement of the finger 50 in an axial direction. This mechanical advantage greatly minimizes the amount of force which must be exerted to displace the lever 30 from the position of FIG. 5 to the sealed position of FIG. 6.

It will be observed that, as the lever 30 is swung inwardly, the axis of link pin 36 approaches a line X between the axes of pins 38 and 32, as mechanical advantage increases. In FIG. 6, the center of pin 36 has passed to the opposite side of the line X, with further inward movement of the lever 30 being limited by engagement of the link 34 with the body member 18 and more specifically a flange 54. This relationship of the center to the line X is known as an over center position.

FIG. 6 is the fully locked position of the locking mechanism 20. It is a finite position determined by engagement of the link 34 with the flange 54. In this position, internal fluid pressures which would tend to separate the coupler 12 from the adapter 10 are transmitted to the fingers 50, tending to rotate the cam member 22 (in FIG. 6) in a counterclockwise direction. Such rotation is prevented by engagement of the link 34 with the flange 54. Further such separating force is working at a substantial mechanical disadvantage so that there is a high degree of reliability that an effective sealing pressure will be maintained between the adapter surface 16 and the gasket 48.

It will be noted that maximum axial displacement of the adapter occurs when the center of pin 36 lies on line X. When this center passes inwardly of line X, the finger 50 moves slightly rearwardly. This results in a minimal relaxation of the sealing pressure, but does not adversely affect the desired sealing relationship.

It will also be noted that, in the closed position of the locking mechanisms, the curvature of the ends of fingers 50 match the curvature of the undercut surface 52. Thus there is line engagement between the fingers 50 and the surface 52. This reduces the unit pressure loading on these surfaces when the coupling is subjected to internal fluid pressure.

To disconnect the present coupling, the levers 30 are simply swung outwardly to there open positions. Again, very little force is required to obtain this end due to the high mechanical advantage in displacing the links 34 over the center to a position above the line X. Ease of disconnection is also facilitated by the great minimal frictional forces inherent in operation of the locking mechanisms.

In summary, the locking mechanism 20 of the present invention comprises a four bar linkage which has several advantages. The levers 30 have open positions in which the coupler 12 may be telescoped over the adapter 10. With relatively small pivotal movement, the levers can bring the sealing surface of the adapter into contact with gasket 48 and then exert a compressive sealing pressure thereagainst. The variable mechanical advantage and the greatly reduced frictional forces minimize the force required by a worker in connecting the coupler and the adapter. Further, due to the over the center relation of the linkage, there is a finite locked position for the levers so that a worker will now that the coupling is properly connected. Also, this over the center relation prevents loss of a sealing pressure between the coupling components due to internal fluid pressure, or due to external pressures on the coupling during the flow of fluid therethrough. Inadvertent disengagement of the locking mechanism is also minimized by the levers 30 lying in close proximity to and parallel to the coupler body member 18 in their closed positions.

For most applications, quick connect-disconnect couplings employ two locking mechanisms, as herein described. In some larger size couplings, three, equi-angularly spaced locking mechanisms are used. Also, it is possible that, under some circumstances, a single locking mechanism, would suffice for the broader purposes of the present invention.

Further, while it is preferred that a gasket be employed in obtaining a seal between the coupler and the adapter, its use would not be essential to other aspects of the invention.

Other variations from the described embodiment will occur to those skilled in the art within the spirit and scope of the present invention which are set forth in the following claims.

Having thus described the invention, what is claimed as novel and desired to be secured by Letters Patent of the United States is:

1. A quick connect-disconnect coupling comprising
   an adapter adapted to be mounted on a first fluid conduit and having a sealing surface at its outer end and an undercut outer surface spaced from and adjacent thereto, and
   a coupler adapted to be attached to a second fluid conduit and comprising a body member having a bore for telescopingly receiving the outer end portion of the adapter, and locking mechanism for joining said coupler and adapter,
   said locking mechanism comprising
   a four bar linkage including
   a manually operable lever,
   a link pivotally connected to the lever and to the body member, and
   a cam member having pivotal connections with the lever and the body member,
   said cam member having a projecting portion extending beyond and inwardly from its pivotal connection with the body member,
   said protruding cam being engageable with the undercut surface of the adapter when it is telescoped within the bore of the body member,
   said lever being displaceable between an open position and a closed position,
   said cam portion being disposed outside the outline of said bore in the open position of said lever,
   said cam portion swinging inwardly as said lever is displaced towards its closed position,
   said cam portion engaging the undercut surface of the adapter when the adapter is telescoped into said bore,
   the point of contact between said cam portion and said undercut portion closely approaching a plane normal to the axis of said bore and passing through the axis of the pivotal connection of the cam member with the body member, as the lever nears its closed position, said point of contact passing to the opposite side of said plane when the lever is fully displaced to its closed position,
   whereby, the movement vector of the cam portion, at its point of engagement with said undercut portion is essentially axial and there is minimal relative movement between the cam portion and the undercut portion.

2. A quick connect-disconnect coupling as in claim 1 wherein
   the can member is disposed essentially normal to the axis of said bore in the closed position of said lever and the pivotal connection between said link and said lever passes over the center of the pivotal connections of said link and lever with said body member.

3. A quick connect-disconnect coupling as in claim 1 wherein
the mechanical advantage of lever movement relative to movement of the protruding cam portion increases as the lever approaches its closed position.

4. A quick connect-disconnect coupling as in claim 3 wherein the coupler further includes
a gasket mounted in said body member and engageable by the sealing surface of the adapter.

5. A quick connect-disconnect coupling as in claim 1 wherein
the surface of said protruding cam portion, which is engageable with the undercut surface of the adapter, is convexly curved.

6. A quick connect-disconnect coupling as in claim 1 further comprising
a plurality of said locking mechanisms.

7. A coupler for a quick connect-disconnect coupling,
said coupler being adapted for connection with an adapter having an annular sealing surface at its outer end and an arcuate groove formed in its outer surface adjacent its outer end, the portion of said groove adjacent said outer end providing an undercut surface,
said coupler comprising
a tubular body member having a bore extending inwardly from the outer end thereof and adapted to receive the outer end portion of an adapter,
said bore terminating intermediate the length of said body member,
a gasket disposed at the inner end of said bore, and
locking mechanisms respectively disposed on opposite sides of said body member, each locking mechanism comprising
a cam member,
a manually operable lever, and
a link,
said body member having, on opposite sides, slots therethrough, adjacent the outer end thereof,
said cam members being disposed, respectively, in the body member slots and pivotally mounted relative to the body member for pivotal movement in a plane radial of the axis of said body member,
each of said links being pivotally mounted, at one end, on the body member for pivotal movement in said radial plane, the center of pivotal movement therefor being spaced axially inwardly of the center of pivotal movement of the cam member relative to the body member,
each of said levers being pivotally connected to a link and to a cam member, also for pivotal movement in said radial plane,
said lever being displaceable between an open position in which it is angled outwardly from said body member and a closed position in which it is adjacent to and generally parallel to the body member,
said cam member having a protruding portion extending beyond and inwardly of its pivotal connection with the body member, which portion is engageable with the undercut surface of an adapter when an adapter is telescoped into said bore,
said protruding portion being disposed outside the outline of said bore when the lever is in its open position and responsive to movement of said lever towards its closed position to engage said undercut surface and displace the sealing surface of the adapter into engagement with said gasket,
the point of contact between said cam portion and said undercut portion closely approaching a plane normal to the axis of said bore and passing through the axis of the pivotal connection of the cam member with the body member, as the lever nears its closed position, said point of contact passing to the opposite side of said plane when the lever is fully displaced to its closed position,
whereby, the movement vector of the cam portion, at its point of engagement with said undercut portion is essentially axial and there is minimal relative movement between the cam portion and the undercut portion,
the center of pivotal movement between said link and lever being disposed outwardly of a line between the center of pivotal movement between the link and body member and the center of pivotal movement between the cam member and the lever, in the open position of the lever,
the center of movement between the link and lever moving towards said line as the lever is displaced towards its closed position, thereby providing an increasing mechanical advantage of lever force relative to the force which the cam member protruding portion exerts on the undercut surface of the adapter,
whereby movement of the lever will exert a high sealing pressure by the sealing surface engaging and compressing said gasket, with a minimum of effort required to operate the lever.

8. A coupler a for quick connect-disconnect coupling as in claim 7 wherein
in the open position of each locking mechanism lever,
the cam member connected thereto is angled towards the outer end of the coupler, and
in the closed position of the lever,
the cam member is angled towards the undercut surface of the adapter.

9. A coupler for a quick connect-disconnect coupling as in claim 8 wherein
in each locking mechanism,
the center of pivotal movement between the link and lever passes inwardly of the line connecting said centers in the closed position of the lever, and
further including
means for limiting movement of said locking mechanism to position the pivot center between the link and lever a relatively short distance inwardly of the line connecting said centers, in the closed position of the lever,
thereby providing an over the center relation locking the lever in its closed position.

10. A coupler for a quick connect-disconnect coupling as in claim 9 wherein
in each locking mechanism,
the means for limiting movement comprise
a flange on the body member which is engaged by said link in the closed position of the lever.

11. A coupler for a quick connect-disconnect coupling as in claim 9 wherein
in each locking mechanism,
the portion of the cam member protruding portion, which engages the undercut surface of an adapter, is convexly curved.

12. A coupler for a quick connect-disconnect coupling as in claim 11 wherein in each locking mechanism, the convexly curved portion of the cam member protruding portion is formed on a radius approximating the radius of curvature of the groove in an adapter, and in the closed position of the lever, the curved surface of the protruding cam portion and the undercut adapter surface are coincident.

* * * * *